United States Patent
Leslie et al.

(10) Patent No.: US 12,408,663 B2
(45) Date of Patent: *Sep. 9, 2025

(54) ANTIMICROBIAL COMPOSITION

(71) Applicant: GOJO Industries, Inc., Akron, OH (US)

(72) Inventors: Rachel Anne Leslie, Akron, OH (US); Dewain Keith Garner, Copley, OH (US); James Edmund Bingham, Akron, OH (US); Travis Neal, Akron, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,860

(22) Filed: Apr. 27, 2023

(65) Prior Publication Data

US 2024/0074435 A1 Mar. 7, 2024

Related U.S. Application Data

(63) Continuation of application No. 16/132,696, filed on Sep. 17, 2018, now Pat. No. 11,678,662.

(60) Provisional application No. 62/559,221, filed on Sep. 15, 2017.

(51) Int. Cl.
*A01N 25/30* (2006.01)
*A01N 31/02* (2006.01)
*A01N 37/10* (2006.01)

(52) U.S. Cl.
CPC .............. *A01N 31/02* (2013.01); *A01N 25/30* (2013.01)

(58) Field of Classification Search
CPC ........ A01N 31/02; A01N 25/30; A01N 37/10; A01N 37/36; A01N 37/04
See application file for complete search history.

(56) References Cited

U.S. PATENT DOCUMENTS

| | | | |
|---|---|---|---|
| 4,456,543 A | 6/1984 | Owens | |
| 5,389,676 A | 2/1995 | Michaels et al. | |
| 5,607,678 A | 3/1997 | Moore et al. | |
| 6,821,943 B2 | 11/2004 | Avery et al. | |
| 7,119,055 B2 | 10/2006 | Cheung et al. | |
| 7,393,820 B2 | 7/2008 | Soldanski et al. | |
| 7,405,188 B2 | 7/2008 | Chen | |
| 7,704,932 B2 | 4/2010 | Evans et al. | |
| 7,833,956 B2 | 11/2010 | Ryklin | |
| 8,030,268 B2 | 10/2011 | Gambogi et al. | |
| 8,119,588 B2 | 2/2012 | Bernhardt et al. | |
| 8,673,277 B2 | 3/2014 | Tamareselvy et al. | |
| 8,834,857 B1 | 9/2014 | Winston et al. | |
| 9,068,148 B2 | 6/2015 | Tamareselvy et al. | |
| 9,277,749 B2 | 3/2016 | Bingham et al. | |
| 9,277,750 B2 | 3/2016 | Scholz et al. | |
| 9,364,402 B1 | 6/2016 | Garcia et al. | |
| 9,578,879 B1 | 2/2017 | Bingham et al. | |
| 9,579,272 B2 | 2/2017 | Galleguillos et al. | |
| 9,675,535 B2 | 6/2017 | Vermeulen et al. | |
| 9,758,746 B2 | 9/2017 | Meno | |
| 9,820,482 B2 | 11/2017 | Bingham et al. | |
| 9,861,565 B2 | 1/2018 | Harmalker et al. | |
| 10,334,846 B2 | 7/2019 | Bingham et al. | |
| 10,405,545 B2 | 9/2019 | Bingham et al. | |
| 10,827,749 B2 | 11/2020 | Bingham et al. | |
| 11,185,482 B2 | 11/2021 | Padyachi et al. | |
| 11,185,483 B2 | 11/2021 | Copeland et al. | |
| 11,660,258 B2 * | 5/2023 | Copeland ............... | A61K 8/365 510/505 |
| 11,678,662 B2 | 6/2023 | Leslie et al. | |
| 11,998,626 B2 * | 6/2024 | Copeland ............... | A61Q 19/10 |
| 2005/0079987 A1 | 4/2005 | Cartwright et al. | |
| 2005/0113276 A1 * | 5/2005 | Taylor .................... | A61K 47/10 510/424 |
| 2007/0231295 A1 | 10/2007 | Hoppe et al. | |
| 2008/0286223 A1 | 11/2008 | Fuls et al. | |
| 2008/0287373 A1 | 11/2008 | Popp | |
| 2008/0312327 A1 | 12/2008 | Rypkema et al. | |
| 2010/0204323 A1 | 8/2010 | Theiler et al. | |
| 2011/0028546 A1 | 2/2011 | Kumar | |
| 2013/0053295 A1 | 2/2013 | Kinoshita et al. | |

(Continued)

FOREIGN PATENT DOCUMENTS

| | | |
|---|---|---|
| CA | 2682717 C | 1/2014 |
| CN | 102846257 A | 1/2013 |

(Continued)

OTHER PUBLICATIONS

Karl-Heinz Hill et al. "1.2.4 Glucose-derived surfactants" In: "Sugar-based Surfactants—Fundamentals and Applications", Jan. 1, 2009 (Jan. 1, 2009), CRC Press (Taylor & Francis Group), Boca Raton, USA, XP055518929, ISBN: 978-1-4200-5166-7, pp. 1-14, chapter 1.2.4.1.
M J Fevola: "FORMULATING—Ingredient Profile—Decyl Glucoside", Cosmetics & toiletries: the international magazine of cosmetic technology, Aug. 1, 2012 (Aug. 1, 2012), pp. 552-560, XP05518900, Retrieved from the Internet: URL: http://www.tib.eu/en/search/id/olc%3A1901484769/FORMULATING-Ingredient-Profile-Decyl-Glucoside/ [retrieved on Oct. 25, 2018].
Database WPI Week 201343 Thomson Scientific, London, GB; an 2013-E88555 XP002786024, & CN 102 846 257 A (Tongling Jieya Biotechnology Co Ltd) Jan. 2, 2013 (Jan. 2, 2013) abstract.

(Continued)

*Primary Examiner* — Mina Haghighatian
(74) *Attorney, Agent, or Firm* — Calfee, Halter & Griswold LLP (57) ABSTRACT

An antimicrobial composition is provided that comprises about 10.0 to about 40.0 wt. % of one or more $C_{1-8}$ alcohols, based on the total weight of the antimicrobial composition; and two or more of a surfactant; an enhancer; and a buffer. The pH of the composition is less than or equal to about 6.0 and the composition achieves a microbial log reduction of greater than 4.0 log CFU/ml at a contact time of 1 minute, in accordance ASTM E2783.

16 Claims, 4 Drawing Sheets

(56) References Cited

U.S. PATENT DOCUMENTS

| | | | |
|---|---|---|---|
| 2013/0071412 A1* | 3/2013 | Leighton | A61K 47/644 514/3.3 |
| 2013/0172415 A1 | 7/2013 | Vermeulen et al. | |
| 2014/0024711 A1 | 1/2014 | Hedbom et al. | |
| 2014/0041686 A1 | 2/2014 | Ryther et al. | |
| 2014/0113040 A1 | 4/2014 | Gutzmann et al. | |
| 2014/0275255 A1 | 9/2014 | Pedersen et al. | |
| 2014/0322285 A1 | 10/2014 | Bui et al. | |
| 2015/0094368 A1 | 4/2015 | Scholz et al. | |
| 2015/0272969 A1 | 10/2015 | Ahmed et al. | |
| 2016/0143274 A1 | 5/2016 | Bingham et al. | |
| 2018/0098923 A1 | 4/2018 | Hutton, III | |
| 2018/0133133 A1 | 5/2018 | Kleinen et al. | |
| 2018/0311128 A1 | 11/2018 | Copeland et al. | |
| 2019/0082684 A1 | 3/2019 | Leslie et al. | |
| 2019/0261628 A1 | 8/2019 | Bingham et al. | |
| 2020/0131454 A1 | 4/2020 | Copeland et al. | |
| 2021/0069091 A1 | 3/2021 | Oh et al. | |
| 2022/0062128 A1 | 3/2022 | Padyachi et al. | |
| 2022/0079851 A1 | 3/2022 | Copeland et al. | |

FOREIGN PATENT DOCUMENTS

| | | | |
|---|---|---|---|
| JP | 11099088 A | 4/1999 | |
| JP | 2006347941 A | 12/2006 | |
| JP | 2011236204 A | 11/2011 | |
| JP | 5552041 B2 | 7/2014 | |
| WO | 9221238 A1 | 12/1992 | |
| WO | 9221239 A1 | 12/1992 | |
| WO | 9535364 A1 | 12/1995 | |
| WO | 9726855 A1 | 7/1997 | |
| WO | 9943205 A1 | 9/1999 | |
| WO | 0153443 A1 | 7/2001 | |
| WO | 2004003126 A1 | 1/2004 | |
| WO | 2006136774 A1 | 12/2006 | |
| WO | 2007139844 A2 | 12/2007 | |
| WO | 2012119644 A1 | 9/2012 | |
| WO | 2013066403 A1 | 5/2013 | |
| WO | 2014083330 A1 | 6/2014 | |
| WO | 2015042013 A1 | 3/2015 | |
| WO | 2015138479 A1 | 9/2015 | |
| WO | 2018022016 A1 | 2/2018 | |
| WO | 2019008937 A1 | 1/2019 | |

OTHER PUBLICATIONS

Database WPI Week 201415 Thomson Scientific, London, GB; AN 2014-D49931 XP002786025, & CN 103 468 424 A (Chen L) Dec. 25, 2013 (Dec. 25, 2013) abstract.

Anonymous: "Buffer Reference Center—Biological Buffers", based on: Dawson, R. M. C; Elliot, D.C.; Elliot, W.H.; Jones, K.M. Data for Biochemical Research; 3rd ed., Oxford Science Publ., 1986 (Jan. 1, 1986), pp. 1-7, XP055518957, U.S.A. Retrieved from the Internet: URL:https://www.sigmaaldrich.com/life-science/core-bioreagents/biological-buffers/learning-center/buffer-reference-center.printerview.html [retrieved on Oct. 25, 2018] p. 4.

International Search Report and Written Opinion from PCT/US2018/051352 dated Jan. 8, 2019.

Invitation to Pay Additional Fees from PCT/US2018/051352 dated Nov. 14, 2018.

Restaino et al, "Antimicrobial efficacy of a new organic acid anionic surfactant against various bacterial strains," Journal of Food Protection, vol. 57, No. 6, pp. 496-501, 1994.

* cited by examiner

ANTIMICROBIAL COMPOSITION

RELATED APPLICATIONS

This application is a continuation of U.S. application Ser. No. 16/132,696, filed on Sep. 17, 2018, which claims priority to and the benefit of U.S. application Ser. No. 62/559,221, filed on Sep. 15, 2017, the entire disclosures of which are incorporated herein by reference.

BACKGROUND OF THE INVENTION

Antimicrobial compositions, sterilizers, disinfectants, and sanitizers are commercially important products and are widely used in personal, healthcare, and industrial settings, as well as in retail, food, and consumer setting.

Disinfecting or sanitizing compositions have become increasingly popular for providing antimicrobial effectiveness to the skin. Similarly, sanitizing or disinfecting compositions for hard surfaces, such as countertops, walls, floors, etc., are also increasing in demand. These sanitizing or disinfecting compositions are often formulated as alcohol-based, and generally include greater than 50 wt. % of an alcohol and/or additional actives such as quaternary ammonium compounds.

It has generally been accepted that disinfecting and sanitizing compositions require a high alcohol concentration to possess rapid antimicrobial activity. Typically, disinfecting and sanitizing compositions with less than 40.0 wt. % alcohol are considered ineffective at killing germs rapidly, such as in an exposure period of 10 minutes or less. Alcohol-based sanitizers, such as those comprising ethanol, typically have the additional advantage of rapid evaporation from the skin and other surfaces. However, skin treated with high levels of alcohol may exhibit skin dryness and/or irritation.

Accordingly, sanitizing and disinfectant compositions having low alcohol concentrations have been developed, while still providing rapid antimicrobial activity.

SUMMARY

Various exemplary embodiments of the subject invention are directed to an antimicrobial composition that includes about 10.0 to about 40.0 wt. % of one or more $C_{1-8}$ alcohols, based on the total weight of the antimicrobial composition, and two or more of a surfactant; an enhancer, and/or a buffer, wherein the pH of the antimicrobial composition is less than or equal to about 6.0. In various exemplary embodiments, the antimicrobial composition achieves a microbial log reduction of greater than 4.0 log CFU/mL at a contact time of 1 minute, in accordance with ASTM E2783. In some exemplary embodiments, the $C_{1-8}$ alcohol is one or more of methanol, ethanol, propanol, and mixtures thereof.

In some exemplary embodiments, the composition comprises between about 12.0 and about 30.0 wt. % of the $C_{1-8}$ alcohol, based on the total weight of the antimicrobial composition.

In various exemplary embodiments, the buffer comprises an organic acid and salts thereof and is present in an amount from about 0.2 to about 10.0 wt. %, based upon the total weight of the antimicrobial composition.

In some exemplary embodiments, the enhancer is one or more of an aromatic containing salt compound, an unsaturated organic acid or salt of an unsaturated organic acid compound, an aromatic organic acid, aromatic sulfate, saturated organic diol, organic aldehyde, and/or an aromatic alcohol. In various exemplary embodiments, the enhancer is selected from the group consisting of sorbic acid, sorbate compounds, benzoic acid, benzoate compounds, sulphur dioxide, sulphite compounds, natamycin, nitrate, nitrate compounds, salicylic acid, phenoxyethanol, thymol, cinnamaldehyde, methylparaben, propylparaben, sodium xylene sulfonate, 1,2 octane diol, 1,2 decane diol, and salts thereof. In some instances, the enhancer is present in an amount from about 0.01 to about 5.0 wt. %, based on the total weight of the antimicrobial composition.

In some exemplary embodiments, the surfactant is selected from the group consisting of non-ionic surfactants, anionic surfactants, and mixtures thereof. In some instances, the surfactant is a non-ionic surfactant, such as ethoxylated alcohol, alkyl polyglucoside, a polyalkoxylated dimethicone, or a combination thereof.

In accordance with further exemplary embodiments, an antimicrobial composition is provided that includes about 10.0 to about 40.0 wt. % of one or more $C_{1-8}$ alcohols, based on the total weight of the antimicrobial composition; and two or more of a surfactant, a buffer, and an enhancer. The pH of the antimicrobial composition is less than or equal to about 6.0. In some exemplary embodiments, the antimicrobial composition results in no more than 15% of carriers positive within a contact time of no greater than 5 minutes in accordance with AOAC 961.02.

In some exemplary embodiments, the composition comprises between about 12.0 and about 30.0 wt. % of the $C_{1-8}$ alcohol, based on the total weight of the antimicrobial composition.

In various exemplary embodiments, the buffer comprises an organic acid and salts thereof and is present in an amount from about 0.2 to about 10.0 wt. %, based upon the total weight of the antimicrobial composition.

In some exemplary embodiments, the enhancer is one or more of an aromatic containing salt compound, an unsaturated organic acid or salt of an unsaturated organic acid compound, an aromatic organic acid, aromatic sulfate, saturated organic diol, organic aldehyde, and/or an aromatic alcohol. In various exemplary embodiments, the enhancer is selected from the group consisting of sorbic acid, sorbate compounds, benzoic acid, benzoate compounds, sulphur dioxide, sulphite compounds, natamycin, nitrate, nitrate compounds, salicylic acid, phenoxyethanol, thymol, cinnamaldehyde, methylparaben, propylparaben, sodium xylene sulfonate, 1,2 octane diol, 1,2 decane diol, and salts thereof. In some instances, the enhancer is present in an amount from about 0.01 to about 5.0 wt. %, based on the total weight of the antimicrobial composition.

In some exemplary embodiments, the surfactant is selected from the group consisting of non-ionic surfactants, anionic surfactants, and mixtures thereof. In some instances, the surfactant is a non-ionic surfactant, such as ethoxylated alcohol, alkyl polyglucoside, a polyalkoxylated dimethicone, or a combination thereof.

In some exemplary embodiments, the antimicrobial composition is applied to a wipe.

Further exemplary embodiments of the subject invention are directed to an antimicrobial composition that includes less than about 35.0 wt. % of one or more $C_{1-8}$ alcohols, based on the total weight of the antimicrobial composition, and from about 0.50 to about 3.0 wt. % of two or more of alkyl polyglucoside, a buffer, and an enhancer, wherein the pH of the antimicrobial composition is less than or equal to about 5.0.

In some exemplary embodiments, the composition comprises between about 10.0 and about 30.0 wt. % of the $C_{1-8}$ alcohol, based on the total weight of the antimicrobial composition.

In various exemplary embodiments, the buffer comprises an organic acid and salts thereof and is present in an amount from about 0.2 to about 3.0 wt. %, based upon the total weight of the antimicrobial composition.

In some exemplary embodiments, the enhancer is one or more of an aromatic containing salt compound, an unsaturated organic acid or salt of an unsaturated organic acid compound, an aromatic organic acid, aromatic sulfate, saturated organic diol, organic aldehyde, and/or an aromatic alcohol. In various exemplary embodiments, the enhancer is selected from the group consisting of sorbic acid, sorbate compounds, benzoic acid, benzoate compounds, sulphur dioxide, sulphite compounds, natamycin, nitrate, nitrate compounds, salicylic acid, phenoxyethanol, thymol, cinnamaldehyde, methylparaben, propylparaben, sodium xylene sulfonate, 1,2 octane diol, 1,2 decane diol, and salts thereof. In some instances, the enhancer is present in an amount from about 0.01 to about 5.0 wt. %, based on the total weight of the antimicrobial composition.

In some exemplary embodiments, the antimicrobial composition has a pH of from about 1.5 to about 4.0.

Yet further exemplary embodiments of the present invention are directed to an antimicrobial composition comprising about 0.05 to about 5.0 wt. % of at least one surfactant; about 0.05 to about 5.0 wt. % of at least one buffer; and about 0.01 to about 3.0 wt. % of at least one enhancer, wherein the pH of the antimicrobial composition is less than or equal to about 5.0.

In some exemplary embodiments, the antimicrobial composition further includes less than about 40.0 wt. % of one or more $C_{1-8}$ alcohols, based on the total weight of the antimicrobial composition.

Yet further exemplary embodiments of the present invention are directed to a wipe comprising an antimicrobial composition comprising about 10.0 to about 40.0 wt. % of one or more $C_{1-8}$ alcohols, based on the total weight of the antimicrobial composition; and two or more of a surfactant, a buffer, and an enhancer. The pH of the antimicrobial composition is less than or equal to about 6.0 and the antimicrobial composition results in no more than 15% of carriers positive within a contact time of no greater than 5 minutes in accordance with AOAC 961.02, modified for towelettes.

DETAILED DESCRIPTION

Unless otherwise defined, all technical and scientific terms used herein have the same meaning as commonly understood by one of ordinary skill in the art to which this application pertains. Although other methods and materials similar or equivalent to those described herein may be used in the practice or testing of the exemplary embodiments, exemplary suitable methods and materials are described below. In case of conflict, the present specification including definitions will control. In addition, the materials, methods, and examples are illustrative only and not intended to be limiting of the general inventive concepts.

The terminology as set forth herein is for description of the exemplary embodiments only and should not be construed as limiting the application as a whole. Unless otherwise specified, "a," "an," "the," and "at least one" are used interchangeably. Furthermore, as used in the description of the application and the appended claims, the singular forms "a," "an," and "the" are inclusive of their plural forms, unless contradicted by the context surrounding such.

Unless otherwise indicated, all numbers expressing quantities of ingredients, chemical and molecular properties, reaction conditions, and so forth used in the specification and claims are to be understood as being modified in all instances by the term "about." The term "about" means within +/−10% of a value, or in some instances, within +/−5% of a value, and in some instances within +/−1% of a value.

The general inventive concepts relate to an antimicrobial composition that contains a synergistic combination of alcohol and at least two or more of a surfactant, an enhancer, and a buffer. The antimicrobial composition demonstrates rapid, broad spectrum activity against microorganisms even at low levels of alcohol (such as at levels no greater than 40 wt. % of the antimicrobial composition).

The physical form of the antimicrobial composition is not particularly limited, and in one or more embodiments, the composition may be presented as a liquid, such as one that is absorbed onto a wipe, poured, pumped, sprayed, or otherwise dispensed; a gel, an aerosol; or a foam, including both aerosol and non-aerosol foams. In one or more embodiments, the antimicrobial composition may be presented on a wipe, i.e. a tissue or cloth that is wiped over a surface.

In some exemplary embodiments, the antimicrobial composition may be employed on a wide variety of surfaces or substrates, including hard surfaces, soft surfaces, animate surfaces (such as skin), non-living (inanimate) surfaces, soil, porous, and non-porous surfaces. In some exemplary embodiments, the antimicrobial composition is employed to disinfect or otherwise sanitize inanimate objects such as instruments, medical equipment, furniture, handrails, textiles, etc.

Some exemplary embodiments of the subject antimicrobial composition are directed to skin applications and meet the requirements for Hand Hygiene Standards Food and Drug Administration performance requirements when tested according to ASTM E2755, ASTM E1174, ASTM E2783, European Standard EN1500 and EN1499.

In some exemplary embodiments, the antimicrobial composition meets the requirements for sanitizing and disinfection as set forth by the EPA. In one or more embodiments, the antimicrobial composition meets the EPA requirements for broad spectrum disinfection. In one or more embodiments, the antimicrobial composition meets the requirements for hospital grade disinfection. In one or more embodiments, the antimicrobial composition meets the EPA requirements as a sanitizer (non-food contact) in accordance with ASTM E1153. In one or more embodiments, the antimicrobial composition meets the EPA requirements as a sanitizer (food contact) in accordance with AOAC 960.09. In one or more embodiments, the antimicrobial composition meets the EPA requirements as a disinfectant in accordance with AOAC 961.02.

In some exemplary embodiments, the antimicrobial composition comprises an alcohol or combination of alcohols. By alcohol, it is meant any organic compound which has a hydroxyl functional group bonded to a saturated carbon atom. Alcohol has antimicrobial properties and has the ability to kill many forms of bacteria, fungi, and viruses. In some embodiments, the alcohol is a $C_{1-8}$ alcohol, i.e. an alcohol containing 1 to 8 carbon atoms. Such alcohols may be referred to as lower alkanols. Examples of lower alkanols include, but are not limited to, methanol, ethanol, propanol, butanol, pentanol, hexanol, and isomers and mixtures thereof. The alcohol may be either pure alcohol or denatured alcohol. In one or more exemplary embodiments, the alcohol comprises ethanol, propanol, or butanol, or isomers or mixtures thereof. In one or more exemplary embodiments, the alcohol comprises isopropanol. In other exemplary embodiments, the alcohol comprises ethanol. In some exemplary embodiments, the antimicrobial composition comprises a mixture of alcohols. In one or more embodiments, the antimicrobial composition comprises a mixture of ethanol and isopropanol. In one or more embodiments, the antimicrobial composition comprises a mixture of isopropanol and n-propanol.

While $C_{1-8}$ alcohols are discussed herein, it is envisioned that longer alcohols (alcohols with more than 8 carbon atoms), or alcohols with various other functional groups would be similarly suitable. For example, in addition to the hydroxyl functional group, the alcohol may further contain esters, carboxylic acids, ethers, amides, amines, alkyl halides, phenyls, as well as other carbonyl-containing functional groups.

In some exemplary embodiments, the antimicrobial composition comprises at least about 1.0 wt. % $C_{1-8}$ alcohol, based on the total weight of the antimicrobial composition. In some exemplary embodiments, the antimicrobial composition comprises at least about 2.0 wt. % $C_{1-8}$ alcohol, or at least about 3.0 wt. % $C_{1-8}$ alcohol, or at least about 5.0 wt. % $C_{1-8}$ alcohol, or at least about 7.0 wt. % $C_{1-8}$ alcohol, or at least about 10.0 wt. % $C_{1-8}$ alcohol, or at least about 12.0 wt. % $C_{1-8}$ alcohol, or at least about 15.0 wt. % $C_{1-8}$ alcohol, or at least about 20.0 wt. % $C_{1-8}$ alcohol, or at least about 25.0 wt. % $C_{1-8}$ alcohol, or at least about 30.0 wt. % $C_{1-8}$ alcohol, or at least about 35.0 wt. % $C_{1-8}$ alcohol, based on the total weight of the antimicrobial composition.

In some exemplary embodiments, the antimicrobial composition comprises less than about 50.0 wt. % $C_{1-8}$ alcohol, based on the total weight of the antimicrobial composition. In some exemplary embodiments, the antimicrobial composition comprises less than about 45.0 wt. % $C_{1-8}$ alcohol, or less than about 40.0 wt. % $C_{1-8}$ alcohol, or less than about 35.0 wt. % $C_{1-8}$ alcohol, or less than about 30.0 wt. % $C_{1-8}$ alcohol, or less than about 25.0 wt. % $C_{1-8}$ alcohol, or less than about 20.0 wt. % $C_{1-8}$ alcohol, or less than about 15.0 wt. % $C_{1-8}$ alcohol, based on the total weight of the antimicrobial composition.

In some exemplary embodiments, the antimicrobial composition comprises from about 3.0 to about 40.0 wt. % $C_{1-8}$ alcohol, or from about 5.0 to 40.0 wt. % $C_{1-8}$ alcohol, or from about 7.0 to about 37.0 wt. % $C_{1-8}$ alcohol, or from about 9.0 to about 35.0 wt. % $C_{1-8}$ alcohol, or from about 10.0 to about 32.0 wt. % $C_{1-8}$ alcohol, or from about 12.0 to about 30.0 wt. % $C_{1-8}$ alcohol, or from about 15.0 to about 25.0 wt. % $C_{1-8}$ alcohol, based on the total weight of the antimicrobial composition and including every narrower numerical range that falls within the broader ranges. In one exemplary embodiment, the antimicrobial composition comprises from about 15.0 to about 25.0 wt. % $C_{1-8}$ alcohol, based on the total weight of the antimicrobial composition. More or less alcohol may be required in certain instances, depending particularly on other ingredients and/or the amounts thereof employed in the sanitizing or disinfecting composition. However, surprisingly, it has further been discovered that increasing the amount of alcohol in the present composition near 40 wt. % does not improve the antimicrobial efficacy and in fact, in some cases, causes the efficacy to decrease.

In some exemplary embodiments, the antimicrobial composition further comprises at least one surfactant. In some exemplary embodiments, the surfactant is one or more of a nonionic, cationic, anionic, amphoteric, and zwitterionic surfactant. In some exemplary embodiments, the antimicrobial composition comprises a mixture of different surfactants. In some exemplary embodiments, the antimicrobial composition comprises a mixture of different types of surfactants (e.g., one or more anionic surfactants and one or more non-ionic surfactants). In other exemplary embodiments, the antimicrobial composition comprises a mixture of the same type of surfactants (e.g., a mixture of different non-ionic surfactants). In another exemplary embodiment, the antimicrobial composition comprises a mixture of an anionic surfactant, a non-ionic surfactant, and an amphoteric surfactant.

The amount of surfactant is not particularly limited, so long as it is at least an efficacy-enhancing amount. The minimum amount of surfactant that corresponds to an efficacy-enhancing amount can be determined by comparing the log kill of the target microbes that is achieved by a composition comprising a select amount of alcohol to a composition comprising the same amount of alcohol and a given amount of surfactant. The amount of surfactant below which no difference in log kill is seen is an efficacy-enhancing amount.

In some exemplary embodiments, the surfactant is present in the antimicrobial composition in an amount from about 0.05 to about 15.0 wt. %, based on the total weight of the antimicrobial composition. In some exemplary embodiments, the surfactant is present in the antimicrobial composition in an amount from about 0.1 to about 10.0 wt. %, or from about 0.2 to about 5.0 wt. %, or from about 0.3 to about 2.5 wt. %, or from about 0.4 to about 2.0 wt. %, or from about 0.5 to about 1.5 wt. %, or from about 0.6 to about 0.8 wt. %, based on the total weight of the antimicrobial composition and including every narrower numerical range that falls within the broader ranges.

In some exemplary embodiments, the antimicrobial composition comprises a detersive amount of nonionic surfactant or a mixture of nonionic surfactants.

In one or more embodiments, the nonionic surfactant includes a hydrophobic region, such as a long chain alkyl group or an alkylated aryl group, and a hydrophilic group comprising an ethoxy and/or other hydrophilic moieties. In one or more embodiments, the composition further includes one or more nonionic foam-boosting co-surfactants having a hydrophobic region having an alkyl group containing six to eighteen carbon atoms, and an average of one to about twenty ethoxy and/or propoxy moieties. Examples of nonionic cleaning surfactants include, but are not limited to, alkyl amine oxide, alkyl ether amine oxide, alkyl alcohol alkoxylates, aryl alcohol alkoxylates, substituted alcohol alkoxylates, block nonionic copolymers, hetero nonionic copolymers, alkanolamides, or polyethoxylated glycerol esters, and mixtures thereof.

In some exemplary embodiments, the nonionic surfactant is an alkyl polyglucoside. In some exemplary embodiments, the alkyl polyglucoside is derived from a glucose sugar and a fatty alcohol in which the alkyl group contains 8-18 carbon atoms, glycerol fatty acid esters, polyoxyethylene glycerol fatty acid esters, polyoxyethylene sorbitan fatty acid esters, polyethyleneglycol fatty acid esters and polyoxyethylene polyoxypropylene block copolymers with terminal hydroxyl groups and combinations thereof. In some exemplary embodiments, the nonionic surfactant is caprylyl/capryl gluco side.

Further exemplary nonionic surfactants include fatty alcohols such as cetyl alcohol, stearyl alcohol, cetostearyl alcohol, and oleyl alcohol, polyoxamers, ethoxylated fatty alcohols, such as PEG-80 sorbitan laurate, polyoxyethylene glycol alkyl ethers, such as octaethylene glycol monododecyl ether, and pentaethylene glycol monododecyl ether, polyoxypropylene glycol alkyl ethers, glucoside alkyl ethers, polyoxyethylene glycol octylphenol ethers, polyoxyethylene glycol alkylphenol ethers, such as nonoxynol-9, glycerol alkyl esters such as glyceryl laurate, polyoxyethylene glycol sorbitan alkyl esters, such as polysorbate, sorbitan alkyl esters, cocamide MEA, cocamide DEA, amine oxides, such as dodecyldimethylamine oxide, block copolymers of polyethylene glycol and polypropylene glycol, such as poloxamers, polyethoxylated tallow amine, polyethylene glycol ethers, such as trideceth-9, and mixtures thereof.

Non-limiting examples of suitable nonionic surfactants are also disclosed in McCutcheon's Detergents and Emulsifiers, 1993 Annuals, published by McCutcheon Division, MC Publishing Co., Glen Rock, N.J., pp. 1-246 and 266-273; in the CTFA International Cosmetic Ingredient Dictionary, Fourth Ed., Cosmetic, Toiletry and Fragrance Association, Washington, D.C. (1991) (hereinafter the CTFA Dictionary) at pages 1-651; and in the CTFA Cosmetic Ingredient Handbook, First Ed., Cosmetic, Toiletry and Fragrance Association, Washington, D.C. (1988) (hereafter the CTFA Handbook), at pages 86-94, each incorporated herein by reference.

In one or more embodiments, the nonionic surfactant is alkyl polyglucoside, a polyalkoxylated dimethicone such as PEG-12 dimethicone, trideceth-9, or a combination thereof.

In some exemplary embodiments, the antimicrobial composition comprises a cationic surfactant or a mixture of cationic surfactants. Surfactants are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group.

In some exemplary embodiments, the cationic surfactant contains at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom. In one or more embodiments, the cationic surfactant is selected from alkylamines and their salts, alkyl imidazolines, ethoxylated amines quaternaries, such as alkylbenzyldimethylammonium salts, alkyl benzene salts, heterocyclic ammonium salts, tetra alkylammonium salts, and the like, quaternized polysaccharides, alkyl polysaccharides, alkoxylated amines, alkoxylated ether amines, phospholipids, phospholipid derivatives, and mixtures thereof.

The surfactant compounds classified as amine oxides, amphoterics and zwitterions are themselves typically cationic in near neutral to acidic pH solutions and can overlap surfactant classifications. Polyoxyethylated cationic surfactants may behave like cationic surfactants in acidic solution.

In some exemplary embodiments, the antimicrobial composition comprises an anionic surfactant or a mixture of anionic surfactants. Exemplary anionic surfactants include sulfates, such as sodium alkyl sulfate, sodium dodecyl sulfate, sodium dodecylbenzenesulfonate, sodium laurate, sodium lauryl sulfate (SLS) (also known as sodium dodecyl sulfate (SDS)) and sodium laureth sulfate (SLES), sodium lauryl sarcosinate, potassium lauryl sulfate, ammonium lauryl sulfate, ammonium laureth sulfate, ammonium xylene sulfonate, magnesium laureth sulfate, and sodium myreth sulfate; sulfonates, such as sodium nonanoyloxybenzenesulfonate; carboxylates; sulphated esters; sulphated alkanolamides; alkylphenols; and mixtures thereof. In other exemplary embodiments, the antimicrobial composition comprises an amphoteric surfactant. Amphoteric surfactants, sometimes referred to as ampholytic surfactants, may contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants include acyl/dialkyl ethylenediamine derivatives (e.g., 2-alkyl hydroxyethyl imidazoline derivatives) and their salts, and N-alkylamino acids and their salts. Specific examples include 2-alkyl hydroxyethyl imidazoline, cocoamphopropionate, cocoamphocarboxy-propionate, cocoamphoglycinate, cocoamphocarboxyglycinate, cocoamphopropyl-sulfonate, and cocoamphocarboxy-propionic acid.

Amphoteric surfactants include those derived from coconut products such as coconut oil or coconut fatty acid, including alkyl amphodicarboxylic acid. A specific example of an amphoteric surfactant, disodium cocoampho dipropionate, is commercially available under the tradename Miranol™ FBS from Rhodia Inc., Cranbury, N.J. Another coconut-derived amphoteric surfactant with the chemical name disodium cocoampho diacetate is sold under the tradename Miranol C2M-SF Conc., also from Rhodia Inc., Cranbury, N.J.

A typical listing of amphoteric classes, and species of these surfactants, is given in U.S. Pat. No. 3,929,678, which is incorporated by reference herein. In some exemplary embodiments, the amphoteric surfactant is an amine oxide. Non-limiting examples of suitable amine oxide compounds include 1-Dodecanamine, N,N-dimethyl-, N-oxide; 1-Tetradecanamine, N,N-dimethyl-, N-oxide; Amines, C10-16- alkyldimethyl, N-oxides; Amines, C12-18-alkyldimethyl, N-oxides; Decanamine, N,N-dimethyl-, N-oxide; Hexadecanamine, N,N-dimethyl-, N-oxide; Octadecanamine, N,N-dimethyl-, N-oxide; Amine oxides, cocoalkyldimethyl; Amines, C10-18-alkyldimethyl, N-oxides; Amines, C12-16-alkyldimethyl, N-oxides; Ethanol, 2,2'-iminobis-, N-coco alkyl derivs., N-oxides; Ethanol, 2,2'-(dodecyloxidoimino) bis-; Ethanol, 2,2'-(octadecyloxidoimino)bis-; Ethanol, 2,2'-iminobis-, N-tallow alkyl derivs., N-oxides; Ethanol, 2,2'-[(9Z)-9-octadecenyloxidoimino]bis-ethanol N-oxide. In some exemplary embodiments, the amine oxide is lauramine oxide.

In some exemplary embodiments, the amphoteric surfactant is a zwitterionic surfactant. Typically, a zwitterionic surfactant includes a positive charged quaternary ammonium or, in some cases, a sulfonium or phosphonium ion, a negative charged carboxyl group, and an alkyl group. Zwitterionic surfactants generally contain cationic and anionic groups which ionize to a nearly equal degree in the isoelectric region of the molecule and which can develop strong "inner-salt" attraction between positive-negative charge centers. Non-limiting examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. In some exemplary embodiments, the zwitterionic surfactant is a betaine surfactant, a sultaine surfactant, or a combination thereof. In some exemplary embodiments, the zwitterionic surfactant is a betaine surfactant. In some exemplary embodiments, the zwitterionic surfactant is cocamidopropyl betaine.

In some exemplary embodiments, the antimicrobial composition comprises a buffer (pH-adjuster), such as an acid, to help achieve the pH ranges disclosed herein. In some exemplary embodiments, the acid is an organic acid. In other exemplary embodiments, the buffer is a mixture of an organic acid and an inorganic acid (mineral acid). In some exemplary embodiments, the buffer may comprise a basic (or alkaline) buffer to raise the pH to a more basic level. The basic buffer may comprise a weak base and one of its salts, such as a mixture of ammonia and ammonium chloride.

In some exemplary embodiments, the organic acid has one or more carboxylic acid groups. In other exemplary embodiments, the organic acid contains one or more thiol groups, enol groups, phenol groups, sulfonic groups, or combinations thereof. In some exemplary embodiments, the organic acid is one or more of citric acid, lactic acid, formic acid, acetic acid, propionic acid, butyric acid, caproic acid, oxalic acid, maleic acid, benzoic acid, malic acid, valeric acid, carbonic acid, uric acid, and the like, and the salts thereof. The organic acid can be substituted or un-substituted.

Non-limiting examples of other suitable organic acids include adipic acid, benzene 1,3,5 tricarboxylic acid, chlorosuccinic acid, choline chloride, cis-aconitic acid, citramalic acid, cyclobutane 1,1,3,3 tetracarboxylic acid, cyclohexane 1,2,4,5 tetracarboxylic acid, cyclopentane 1,2,3,4 tetracarboxylic acid, diglycolic acid, fumaric acid, glutamic acid, glutaric acid, glyoxylic acid, isocitric acid, ketomalonic acid, malonic acid, nitrilotriacetic acid, oxalacetic acid, oxalic acid, phytic acid, p-toluenesulfonic acid, salicylic acid, succinic acid, tartaric acid, tartronic acid, tetrahydrofuran 2,3,4,5 tetracarboxylic acid, tricarballylic acid, versene acids, 3-hydroxyglutaric acid, 2-hydroxypropane 1,3 dicarboxylic acid, glyceric acid, furan 2,5 dicarboxylic acid, 3,4-dihydroxyfuran-2,5 dicarboxylic acid, 3,4-dihydroxytetrahydrofuran-2,5-dicarboxylic acid, 2-oxo-glutaric acid, dl-glyceric acid, 2,5 furandicarboxylic acid, and the salts thereof.

In some exemplary embodiments, the buffer includes an inorganic acid. In some exemplary embodiments, the inorganic acid is one or more of a phosphorus-based compound, a sulfur-based compound, or a nitrogen-based compound. Non-limiting examples of suitable inorganic acids include hydrochloric acid, nitric acid, phosphoric acid, sulfuric acid, boric acid, hydrofluoric acid, hydrobromic acid, perchloric acid, bromous acid, iodous acid, and hydroiodic acid. In some embodiments, the acid comprises sulfuric acid. In some exemplary embodiments, the buffer has a pH (under standard conditions; 1 mmol/L) of less than about 4.0, or less than about 3.5, or less than about 3.0, or less than about 2.9, or less than about 2.8.

In some exemplary embodiments, the total amount of buffer is present in an amount from about 0.1 to about 15.0 wt. %, based upon the total weight of the antimicrobial composition. In some exemplary embodiments, the total amount of buffer is present in an amount from about 0.2 to about 10.0 wt. %, or from about 0.3 to about 5.0 wt. %, or from about 0.31 to about 3.0 wt. %, or from about 0.4 to about 2.5 wt. %, or from about 0.5 to about 2.0 wt. %, based upon the total weight of the antimicrobial composition and including every narrower numerical range that falls within the broader ranges.

It has been found that certain acids enhance the antimicrobial efficacy of the compositions, beyond their traditional effect of simply adjusting the pH of the composition. In some exemplary embodiments, acidifying the antimicrobial composition enhances the efficacy of the compositions, such that the efficacy is equivalent to, or greater than, compositions containing much higher amounts of alcohol.

In some exemplary embodiments, the antimicrobial composition further comprises an enhancer. As used herein, the term enhancer means a component that contributes to the overall efficacy of the composition but does not itself have rapid antimicrobial activity (e.g. an exposure time of less than 10 minutes). In some exemplary embodiments, the enhancer is one or more of an aromatic containing salt compound, an unsaturated organic acid or salt of an unsaturated organic acid compound, an aromatic organic acid, aromatic sulfate, saturated organic diol, organic aldehyde and/or an aromatic alcohol. Non-limiting examples of suitable enhancers include sorbic acid, sorbate compounds, benzoic acid, benzoate compounds, sulphur dioxide, sulphite compounds, natamycin, nitrate, nitrate compounds, thymol, cinnamaldehyde, methylparaben, propylparaben, sodium xylene sulfonate, 1,2 octane diol, 1,2 decane diol, and salts thereof. Such salts include, for example, benzoates, sorbates, sulphates, sodium benzoate, sodium sorbate, potassium sorbate, calcium sorbate, and the like. In some exemplary embodiments, the enhancer is listed on the EPA's Minimal Risk Inerts or Ingredients for Use in Food-Contact Surface Sanitizing Solutions. In some exemplary embodiments, the enhancer is a benzoate such as sodium benzoate.

In some exemplary embodiments, the enhancer is added in the antimicrobial composition in an amount less than about 10.0 wt. %, or less than about 5.0 wt. %, or less than about 2.5 wt. %, or less than about 1.5 wt. %, or less than about 1.0 wt. %, or less than about 0.75 wt. %, or less than about 0.5 wt. %, based on the total weight of the antimicrobial composition. In some exemplary embodiments, the enhancer is added from about 0.01 to about 5.0 wt. %, or from about 0.05 to about 3.0 wt. %, or from about 0.1 to about 2.0 wt. %, or from about 0.2 to about 1.0 wt. %, based on the total weight of the antimicrobial composition and including every narrower numerical range that falls within the broader ranges.

In some exemplary embodiments, the pH of the antimicrobial composition is less than about 6.0, or less than about 5.5, or less than about 5.0, or less than about 4.5. In some exemplary embodiments, the pH of the antimicrobial composition is from about 1.5 to about 6.0. In some other exemplary embodiments, the pH of the antimicrobial composition from about 2.0 to about 5.5, or from about 2.5 to about 5.0, or from about 3.0 to about 4.5.

Advantageously, a synergistic antimicrobial effect is observed even when the composition includes no more than 40 wt. % alcohol at an acidic pH. Typically, disinfecting and sanitizing compositions with less than 40.0 wt. % alcohol are considered ineffective at killing germs rapidly, such as in an exposure period of 10 minutes or less. It has surprisingly been found, however, that while compositions containing 40.0 wt. % or less of alcohol typically show insufficient antimicrobial efficacy, the antimicrobial composition described herein having a maximum of 40 wt. % alcohol at an acidic pH exhibits enhanced antimicrobial efficacy in a rapid time frame, such as within an exposure period of 10 minutes or less. In some exemplary embodiments, alcohol concentrations that exhibit little or no efficacy on their own provide an enhanced efficacy when synergistically combined with the ingredients described herein, even at alcohol concentrations that are no more than about 40.0 wt. %, or no more than about 35.0 wt. %, or no more than about 30.0 wt. %, or no more than about 25.0 wt. %, and a further enhanced efficacy when the pH of the antimicrobial composition is less than about 6.0 or less than about 5.0.

Moreover, a further synergistic antimicrobial effect is observed when the antimicrobial composition comprises at least one of a buffer and an enhancer, collectively at a concentration of at least 0.50 wt. %, based on the total weight of the antimicrobial composition, at an acidic pH of no greater than 6. In some exemplary embodiments the concentration of buffer and/or enhancer is collectively at least 0.75 wt. %, based on the total weight of the antimicrobial composition. In various exemplary embodiments, the concentration of buffer and/or enhancer is collectively between 0.50 and 4.0 wt. %, or between 1.0 and 3.0 wt. %, based on the total weight of the antimicrobial composition. A particularly advantageous antimicrobial effect is observed when the buffer is an organic acid, such as citric acid, the enhancer is the salt of an aromatic acid, such as sodium benzoate, and the pH of the composition is less than 6.

The antimicrobial composition may comprise additional ingredients that do not deleteriously affect the synergistic composition disclosed above. For instance, in some exemplary embodiments, the antimicrobial composition may include one or more chelating agents. The chelating agent is not particularly limited and can include any central atom with two or more coordinate bonds between a polydentate ligand. Both organic and inorganic chelating agents can be used in the antimicrobial composition. In some exemplary embodiments, the chelating agent comprises one or more of ethylenediamine, ethylenediaminetetraacetic acid (EDTA) and its salts, ethylenediamine-N,N'-disuccinic acid (EDDS), diethylenetriaminepentaacetic acid, N,N-bis(carboxymethyl)glycine, salicylic acid, polyphosphates, ascorbic acid. In some exemplary embodiments, the chelating agent is EDTA. In some exemplary embodiments, the chelating agent comprises one or more amino acid-based chelant, such as, for example, methylglycine diacetic acid.

In some exemplary embodiments, the chelating agent is added in the antimicrobial composition in an amount up to about 10.0 wt. %, or up to about 5.0 wt. %, or up to about 2.5 wt. %, or up to about 1.5 wt. %, or up to about 1.0 wt. %, or up to about 0.75 wt. %, or up to about 0.5 wt. %, based on the total weight of the antimicrobial composition. In some exemplary embodiments, the chelating agent is included in an amount of at least about 0.001 wt. %, or at least about 0.01 wt. %, or at least about 0.05 wt. %, or at least about 0.1 wt. %, or at least about 0.5 wt. %, or at least about 0.7 wt. %, based on the weight of the antimicrobial composition. In some exemplary embodiments the chelating agent is added from about 0.001 to about 2.0 wt. %, or from about 0.005 to about 1.5 wt. %, or from about 0.05 to about 1.0 wt. %, or from about 0.1 to about 0.8 wt. %, based on the total weight of the antimicrobial composition.

In some exemplary embodiments, the antimicrobial composition is substantially free of, or completely free of fatty acids as well as any salts or derivatives thereof. By "essentially free" it is meant that the antimicrobial composition contains no greater than 5.0 wt. %, preferably no greater than 1.0 wt. %, and more preferably no greater than 0.5 wt. % of the specified compound.

In some exemplary embodiments, the antimicrobial composition further comprises a fragrance. Any scent may be used in the antimicrobial composition including, but not limited to, any scent classification on a standard fragrance chart, such as floral, oriental, woody, and fresh. Exemplary scents include cinnamon, clove, lavender, peppermint, rosemary, thyme, lemon, citrus, coconut, apricot, plum, watermelon, ginger, cranberry, and combinations thereof. In some exemplary embodiments, the fragrance is composed of ingredients listed on the EPA's minimal risk inerts or ingredients for use in food-contact surface sanitizing solutions.

In some exemplary embodiments, the fragrance is included in the antimicrobial composition in an amount from about 0.005 wt. % to about 5.0 wt. %, in other embodiments, from about 0.01 wt. % to about 3.0 wt. %, and in other embodiments, from about 0.05 wt. % to about 1.0 wt. %, or about 0.1 to 0.5 wt. %, based on the total weight of the antimicrobial composition. The fragrance can be made of any perfume, essential oil, aroma compounds, fixatives, terpenes, solvents, and the like. In some exemplary embodiments, the essential oils may include, for example, one or more of Limonene, Citrus Aurantium Dulcis (Orange) Peel Oil, Eucalyptus Globulus Leaf Oil, Citrus Grandis (Grapefruit) Peel Oil, Linalool, Litsea Cubeba Fruit Oil, Lavandula Hybrida Oil, Abies Sibirica Oil, Mentha Citrata Leaf Extract, Coriandrum Sativum (Coriander) Fruit Oil, Piper Nigrum (Pepper) Fruit Oil, and Canarium Luzonicum Gum Nonvolatiles.

In some exemplary embodiments, the antimicrobial composition comprises one or more carriers. The carrier can be any suitable compound able to effectively deliver and/or transport the antimicrobial composition. In some exemplary embodiments, the carrier is water or a base cleaner. Other carriers, such as saline, inorganic salt solutions, fatty esters, ethers, amides, acetates, silicones, triglycerides, and various hydrocarbons. In other exemplary embodiments, the antimicrobial composition does not include any carrier and is delivered as a concentrate.

In some exemplary embodiments, the antimicrobial composition includes water as the carrier. In some exemplary embodiments, the antimicrobial composition comprises at least about 1.0 wt. % of a carrier, or at least about 10.0 wt. % of a carrier, or at least about 20.0 wt. % of a carrier, or at least about 30.0 wt. % of a carrier, or at least about 35.0 wt. % of a carrier, or at least about 40.0 wt. % of a carrier, or at least about 50.0 wt. % of a carrier, or at least about 60.0 wt. % of a carrier, or at least about 70.0 wt. % of a carrier, or at least about 80.0 wt. % of a carrier, or at least about 85.0 wt. % of a carrier, based on the total weight of the antimicrobial composition. In some exemplary embodiments, the antimicrobial composition comprises from about 50.0 wt. % to about 85.0 wt. % of a carrier, or from about 55.0 to about 80.0 wt. % of a carrier, or from about 60.0 to about 75.0 wt. % of a carrier, based on the total weight of the antimicrobial composition and including every narrower numerical range that falls within the broader ranges. More or less of a carrier may be required in certain instances, depending particularly on other ingredients and/or the amounts thereof employed in the antimicrobial composition.

A wide variety of non-limiting cosmetic and pharmaceutical ingredients commonly used in the skin care industry may additionally be suitable for use in the compositions of the present invention. Examples of these ingredients include: abrasives, anti-acne agents, anticaking agents, antioxidants, binders, biological additives, bulking agents, chelating agents, chemical additives; colorants, cosmetic astringents, cosmetic biocides, denaturants, drug astringents, emulsifiers, external analgesics, film formers, foam surfactants, humectants, opacifying agents, plasticizers, preservatives (sometimes referred to as antimicrobials), propellants, reducing agents, skin bleaching agents, skin-conditioning agents (emollient, miscellaneous, and occlusive), skin protectants, solvents, surfactants, foam boosters, hydrotropes, solubilizing agents, suspending agents (nonsurfactant), sunscreen agents, ultraviolet light absorbers, detackifiers, and viscosity increasing agents (aqueous and nonaqueous). Examples of other functional classes of materials useful herein that are well known to one of ordinary skill in the art include solubilizing agents, sequestrants, keratolytics, topical active ingredients, and the like.

Advantageously, auxiliary antimicrobials, some of which can be harsh on surfaces, are not required. In some exemplary embodiments, the antimicrobial composition does not contain any auxiliary antimicrobial ingredients. Any antimicrobial ingredient other than the combination of alcohol, surfactant, enhancer, and buffer may be referred to as an auxiliary antimicrobial agent. In one embodiment, the amount of auxiliary antimicrobial agent is less than about 1.0 wt. %, or less than about 0.5 wt. %, or less than about 0.25 wt. %, or less than about 0.1 wt. %, or less than about 0.05 wt. %, or less than about 0.01 wt. %, based on the total weight of the antimicrobial composition. In some exemplary embodiments, the antimicrobial composition is devoid of auxiliary antimicrobial agents.

Advantageously, certain ingredients that have been designated as critical to current food contact surface cleaners can be limited in the antimicrobial composition of the present invention. Many of these compounds have deleterious side effects that make them undesirable for use in a disinfectant.

In some exemplary embodiments, the amount of hypochlorous acid and precursors thereof, in the antimicrobial composition is limited. In some exemplary embodiments, the amount of hypochlorous acid and precursors thereof, in the antimicrobial composition is less than about 0.5 wt. %, or less than about 0.1 wt. %, based on the total weight of the antimicrobial composition. In some exemplary embodiments, the antimicrobial composition is devoid of hypochlorous acid.

In some exemplary embodiments, the amount of peroxyacids, such as peracetic acid, in the antimicrobial composition may be limited. In some exemplary embodiments, the amount of peroxyacid in the antimicrobial composition is less than 0.5 wt. %, or less than about 0.1 wt. %, based on the total weight of the antimicrobial composition. In another embodiment, the antimicrobial composition is devoid of peroxyacid.

In some exemplary embodiments, the amount of peroxide, such as hydrogen peroxide, in the antimicrobial composition, is limited. In some exemplary embodiments, the amount of peroxide in the antimicrobial composition is less than about 0.5 wt. %, or less than about 0.1 wt. %, based on the total weight of the antimicrobial composition. In some exemplary embodiments, the antimicrobial composition is devoid of peroxide.

In some exemplary embodiments, the amount of quaternary compounds in the antimicrobial composition is limited or completely excluded. Quaternary compounds are compounds that include a positively charged polyatomic ion of the structure $NR^{4+}$, R being an alkyl group or an aryl group. Unlike the ammonium ion ($NH^{4+}$) and the primary, secondary, or tertiary ammonium cations, the quaternary ammonium cations are permanently charged, independent of the pH of their solution. Examples are benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride and domiphen bromide. In some exemplary embodiments, the amount of quaternary compounds in the antimicrobial composition is less than about 0.5 wt. %, or less than about 0.1 wt. %, based on the total weight of the antimicrobial composition. In some exemplary embodiments, the antimicrobial composition is devoid of quaternary compounds.

It is believed that the microstructure of the composition influences the interaction between the composition and surfaces of microorganisms, enhancing the composition's disinfecting ability. The alcohol, enhancer, and buffer combine to influence the micelle structure created by the surfactant. Improved disinfection efficiency reaches a maximum in formulas with less than 40 wt. % alcohol, which indicates the formation of micelles with maximum efficiency for interacting with microorganisms in this region. Due to this reason, increased levels of alcohol actually inhibit the disinfection ability of the formula.

Indeed, any component other than the alcohol, surfactant, enhancer, and buffer is not necessary to achieve the antimicrobial efficacy of the present antimicrobial composition, when combined at a pH below 6 and can optionally be limited to less than about 5.0 wt. %, or less than about 2.0 wt. %, or less than about 1.0 wt. %, or less than about 0.5 wt. %, or to less than about 0.1 wt. %, or to less than about 0.01 wt. %, or to less than about 0.001 wt. %, based on the total weight of the antimicrobial composition. In some exemplary embodiments, the antimicrobial composition is devoid of any component other than alcohol, surfactant, buffer, enhancer, chelating agent, and optionally water or other suitable carrier.

In some exemplary embodiments, the antimicrobial composition comprises less than about 40.0 wt. % of one or more $C_{1-8}$ alcohols, one or more surfactants, an enhancer, and a buffer, and has a pH no higher than 6. In some exemplary embodiments, the antimicrobial composition comprises less than about 40.0 wt. % of one or more $C_{1-8}$ alcohols, one or more nonionic surfactants, and a combined concentration of a buffer and an enhancer of at least 0.50 wt. %. In some exemplary embodiments, the antimicrobial composition comprises less than about 40.0 wt. % of ethanol, a nonionic surfactant, sodium benzoate, and citric acid. In some exemplary embodiments, the antimicrobial composition comprises less than about 40.0 wt. % of ethanol, caprylyl/capryl glucoside, and citric acid. In some exemplary embodiments, the antimicrobial composition comprises less than about 40.0 wt. % of ethanol, caprylyl/capryl glucoside, an enhancer, citric acid, and an inorganic acid. In some exemplary embodiments, the antimicrobial composition includes less than about 30 wt. % ethanol, 0.1-1.0 wt. % caprylyl/capryl glucoside, a combined concentration of citric acid and sodium benzoate of 0.75-4.0 wt. %, and 0.01-0.1 wt. % sulfuric acid. In some exemplary embodiments, the antimicrobial composition comprises one or more nonionic surfactants, a combined concentration of a buffer and an enhancer of at least 0.50 wt. %, and optionally alcohol.

In some exemplary embodiments, the antimicrobial composition is utilized in a premoistened wipe. Generally, the premoistened wipe comprises a composition and a substrate. In some exemplary embodiments, the wipe substrate is selected to tightly hold the antimicrobial composition during preparation and storage, and also readily express the liquid during use.

In some exemplary embodiments, the premoistened wipe includes a substrate comprising a woven or nonwoven web of natural fibers, synthetic fibers, or mixtures of natural and synthetic fibers. Suitable natural fibers include but are not limited to cellulosic fibers, such as wood pulp fibers, cotton, and rayon. Suitable synthetic fibers include fibers commonly used in textiles, including but not limited to polyester and polypropylene fibers.

Various forming methods can be used to form a suitable fibrous web. In some exemplary embodiments, the web can be made by nonwoven dry forming techniques, such as air-laying, or alternatively by wet laying, such as on a papermaking machine. Other nonwoven manufacturing techniques, including but not limited to techniques such as meltblown, spunbond, needle punch, and hydroentanglement (i.e., spunlace) methods, may also be used.

Unexpectedly, when a surfactant is combined with less than about 40.0 wt. % of a $C_{1-8}$ alcohol at a low pH, with a buffer and an enhancer, such as those disclosed herein, antimicrobial activity is synergistically enhanced, which is more than just an additive effect. In some exemplary embodiments, the antimicrobial composition is effective in killing gram negative and gram positive bacteria, fungi, parasites, non-enveloped and enveloped viruses. In some exemplary embodiments, the antimicrobial composition has rapid antimicrobial efficacy against bacteria such as *Staphylococcus aureus*, methicillin-resistant *S. aureus*, *Escherichia coli*, *Pseudomonas aeruginosa*, *Serratia marcescens*, *Mycobacterium bovis*, *Salmonella enterica*, viruses such as Adenovirus, Feline Calicivirus, Hepatitis C, and Rotavirus, fungi such as *Candida albicans*, *Trichophyton interdigitale*, and *Aspergillus niger*, and black mold spores *Stachybotrys chartani*.

EXAMPLES

Examples 1-3 set forth various antimicrobial compositions applied to wipes and tested to determine their effectiveness on hard non-porous, inanimate environmental surfaces according to the AOAC 961.02 method, modified for towelettes. Test cultures of *S. aureus* were used to test each disinfectant's efficacy. Results are expressed as a fraction of carriers that exhibited growth e.g. percent positive carriers.

Example 1

Eleven compositions were prepared and tested under the method described above with a contact time of 90 seconds to determine their effectiveness as a biocide. Carriers inoculated with *Staphylococcus aureus* were tested for each of the compositions in Table 1. Table 1 shows the results of the tests that were performed on various compositions.

TABLE 1

| Composition | Ethanol | Non-ionic surfactant | Total Enhancer | Buffer | pH | Percent Positive |
|---|---|---|---|---|---|---|
| 1a | 20.00% | 0.500% | 0.1000% | 1.500% | 3.0 | 5% |
| 1b | 30.00% | 0.500% | 0.1000% | 1.500% | 3.0 | 18% |
| 2a | 20.00% | 2.000% | 0.1000% | 1.500% | 3.0 | 9% |
| 2b | 30.00% | 2.000% | 0.1000% | 1.500% | 3.0 | 10% |
| 3a | 20.00% | 2.000% | 1.0000% | 1.500% | 3.0 | 3% |
| 3b | 30.00% | 2.000% | 1.0000% | 1.500% | 3.0 | 10% |
| 4a | 20.00% | 0.500% | 1.1000% | 1.500% | 3.0 | 9% |
| 4b | 30.00% | 0.500% | 1.1000% | 1.500% | 3.0 | 15% |
| 5a | 20.00% | 0.500% | 2.0000% | 1.500% | 3.0 | 0% |
| 5b | 30.00% | 0.500% | 2.0000% | 1.500% | 3.0 | 8% |
| 6 | 25.00% | 1.250% | 1.500% | 1.500% | 3.0 | 3% |

In Table 1 above, pairs of substantially identical formulations other than varied ethanol levels were tested. Ethanol is typically active on its own at concentrations from 50-90 wt. %. Typically, an increase in ethanol will result in an increase in antimicrobial efficacy. However, in Compositions 1 a/b, 3 a/b, 4 a/b and 5 a/b, the efficacy of the compositions was higher at 20% ethanol when compared to 30% ethanol (lower percent positive carriers). For Compositions 2 a/b, the level of efficacy held consistent even when ethanol concentration increased. Compositions 3a, 5a, and 6 were the most efficacious formulas and contained 20%, 20% and 25% ethanol, respectively. This data is surprising, based on the accepted assumption that alcohol increases efficacy. Such an assumption does not appear to always hold true in this compositional space.

Example 2

Four compositions comprising only ethanol, a pH adjuster, and water at various pH levels were prepared and tested under the AOAC 961.02 method, modified for towelettes to determine the antimicrobial effectiveness of ethanol alone. Carriers inoculated with *Staphylococcus aureus* were tested using each of the compositions in Table 2. The amount of carriers positive after a contact time of 120 seconds was calculated and reflected below in Table 2.

TABLE 2

| Comp. | Ethanol | Non-ionic Surfactant | Enhancer | Buffer | Chelating Agent | pH Final | Percent Positive |
|---|---|---|---|---|---|---|---|
| 7 | 25.00 wt. % | 0 | 0 | 0 | 0 | not measured | 100% |
| 8 | 40.00 wt. % | 0 | 0 | 0 | 0 | 5.0 | 96.67% |
| 9 | 50.00 wt. % | 0 | 0 | 0 | 0 | 3.29 | 30.00% |
| 10 | 50.00 wt. % | 0 | 0 | 0 | 0 | 3.00 | 73.30% |

Table 2 illustrates that a composition having only 25% ethanol did not demonstrate any efficacy against *S. aureus*. See Composition 7. Moreover, at a pH of 5, an ethanol concentration of 40.00 wt. % demonstrated an efficacy of about 96.67% positive carriers. Only at an ethanol concentration of 50.00 wt. %, along with a pH of 3.29, did the efficacy begin to fall below 50% positive carriers, which is still above the maximum of 15% positive carriers set forth in the present application.

Example 3

A sample with 25.0 wt. % ethanol, 0.62 wt. % decyl glucoside, 0.5 wt. % sodium benzoate, 0.75 wt. % citric acid, and the balance water ("Sample A") was tested according to the methods described above to determine its rapid antimicrobial efficacy. The pH of the composition was 4.0. Table 3 details the results of the efficacy trials of Sample A over 2 minutes. A sample with 20.0 wt. % ethanol, 0.50 wt. % decyl glucoside, 0.10 wt. % sodium benzoate, 1.50 wt. % citric acid, and the balance water ("Sample B") was tested according to the methods described above to determine its antimicrobial efficacy. The pH of the composition was 3.0. Table 3 details the results of the efficacy trials of Sample B over 2 minutes. A sample with 20.0 wt. % ethanol, 0.62 wt. % non-ionic surfactant, 1.50 wt. % enhancer, 1.50 wt. % organic acid, 0.20 wt. % chelating agent, and the balance water ("Sample C") was tested according to the methods described above to determine its antimicrobial efficacy. The pH of Sample C was 4.00. Table 3 details the results of the efficacy trials of Sample D over 90 seconds. A sample with 17.5 wt. % ethanol, 0.62 wt. % non-ionic surfactant, 0.75 wt. % enhancer, 0.6 wt. % organic acid, 0.25 wt. % chelating agent, and the balance water ("Sample D") was tested according to the methods described above to determine its antimicrobial efficacy. The pH of Sample D was 4.00. Table 3 details the results of the efficacy trials of Sample D over 90 seconds. These results demonstrate rapid antimicrobial efficacy in as little as 15 seconds.

TABLE 3

| Time (seconds) | Average Percent Positive |
|---|---|
| Sample A | |
| 0 | 100.00% |
| 15 | 16.67% |
| 30 | 5.79% |
| 60 | 5.26% |
| 90 | 2.73% |
| 120 | 1.67% |
| Sample B | |
| 0 | 100.00% |
| 15 | 70.00% |
| 30 | 15.00% |
| 60 | 10.00% |
| 90 | 2.50% |
| 120 | 2.50% |
| Sample C | |
| 0 | 100.00% |
| 15 | 6.67% |
| 30 | 1.67% |
| 45 | 1.67% |
| 60 | 1.67% |
| 90 | 0.00% |
| Sample D | |
| 0 | 100.00% |
| 15 | 22.50% |
| 30 | 2.50% |
| 45 | 2.50% |
| 60 | 2.50% |
| 90 | 0.83% |

Example 4

The efficacy of individual ingredients compared to a full antimicrobial formulation was tested to demonstrate that the synergistic antimicrobial improvement of the composition is more than just an additive effect. Specifically, five samples were prepared, as outlined below in Table 4, and tested against *S. aureus* at various contact times according to ASTM E2783.

TABLE 4

| | | | | | | Log Reductions (Log CFU/ml) | | | | |
|---|---|---|---|---|---|---|---|---|---|---|
| Sample | Ethanol | Non-ionic surfactant | Buffer | Enhancer | pH | 30 seconds | 2 minutes | 5 minutes | 15 minutes | 30 minutes |
| A | 18.0-22.0% | — | — | — | 4.01 | −0.03 | <1.25 | <1.25 | 3.50 | >5.72 |
| B | — | 0.65-0.8% | — | — | 4.02 | 0.09 | <1.25 | <1.25 | <1.25 | <1.25 |
| C | — | — | — | 0.1-0.4% | 3.91 | −0.10 | <1.25 | <1.25 | <1.25 | <1.25 |
| D | — | — | 1.0-1.5% | — | 4.01 | −0.15 | <1.25 | <1.25 | <1.25 | <1.25 |
| E | 18.0-22.0% | 0.65-0.8% | 1.0-1.5% | 0.1-0.4% | 4.00 | >4.45 | — | — | — | — |

Figure 1:
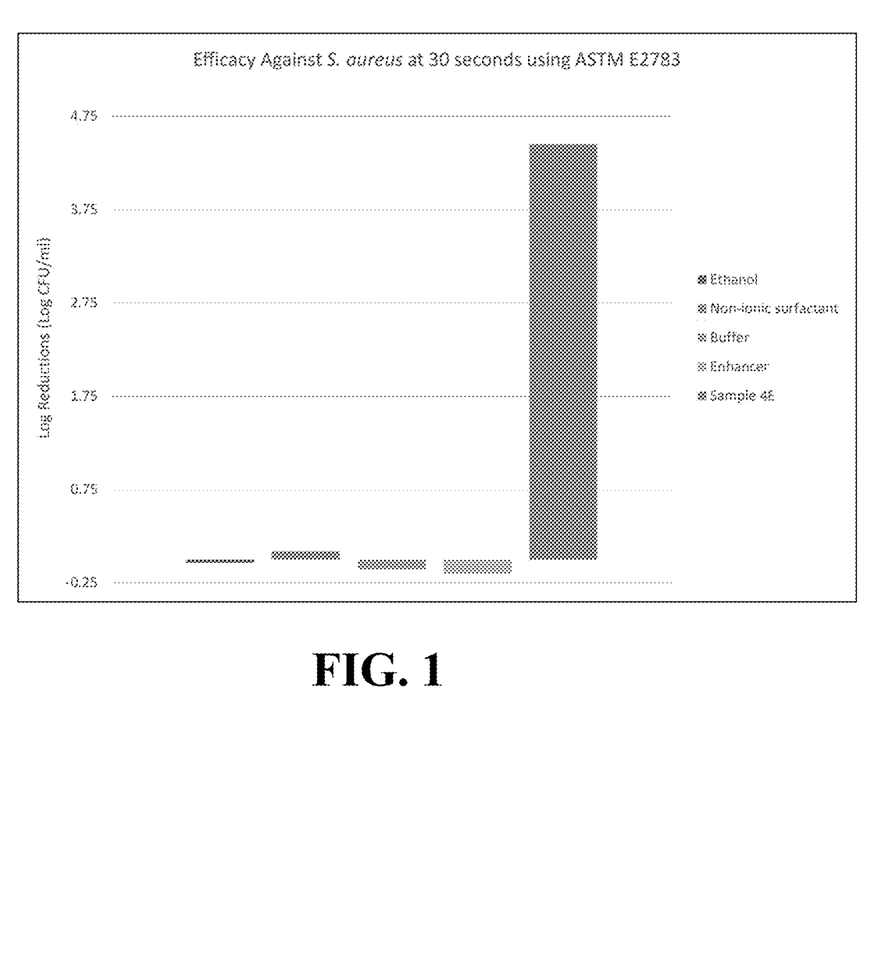
FIG. 1 graphically illustrates the efficacy of individual ingredients against *S. aureus* compared to a full antimicrobial composition formulated in accordance with the present inventive concepts.

As illustrated above in Table 4 and accompanying FIG. 1, at individual concentrations of about 18.0-22.0 wt. % ethanol, 0.65-0.8 wt. % non-ionic surfactant, 1.0-1.5 wt. % buffer, and 0.1-0.4 wt. % enhancer, none of the ingredients exhibited antimicrobial efficacy against *S. aureus* at a pH of about 4.0. (See Samples A, B, C, and D). In contrast, Sample E includes each component combined at the same concentration levels outlined in Sample A, B, C, and D, and demonstrated a significant increase in antimicrobial efficacy. Particularly, Sample E exhibited a log reduction of over 4.45 CFU/ml at 30 seconds, which demonstrates that the synergistic effect of the combination of ingredients used herein is not additive.

Example 5

The efficacy of individual ingredients at varied concentration levels was then tested to demonstrate that even at increased concentrations, the individual ingredients still do not have antimicrobial efficacy. Specifically, nine samples were prepared, as outlined below in Table 5, and tested against *S. aureus* at a contact time of 30 seconds, according to ASTM E2783.

TABLE 5

| Sample | Ethanol | Alkyl polyglucoside | Monosodium Citrate | Sodium Benzoate | pH | Log Reductions (Log CFU/ml) |
|---|---|---|---|---|---|---|
| F | — | — | 1.0-3.0% | — | 4.00 | 0.20 |
| G | — | — | 5.0-7.0% | — | 4.00 | 0.31 |
| H | — | — | 9.0-11.0% | — | 3.99 | 0.22 |
| I | — | — | — | 0.5-1.5% | 4.01 | 0.41 |
| J | — | 0.5-1.5% | — | — | 4.03 | 0.53 |
| K | — | 4.0-6.0% | — | — | 4.02 | 0.63 |
| L | — | 9.0-11.0% | — | — | 4.00 | 0.59 |

Figure 2:
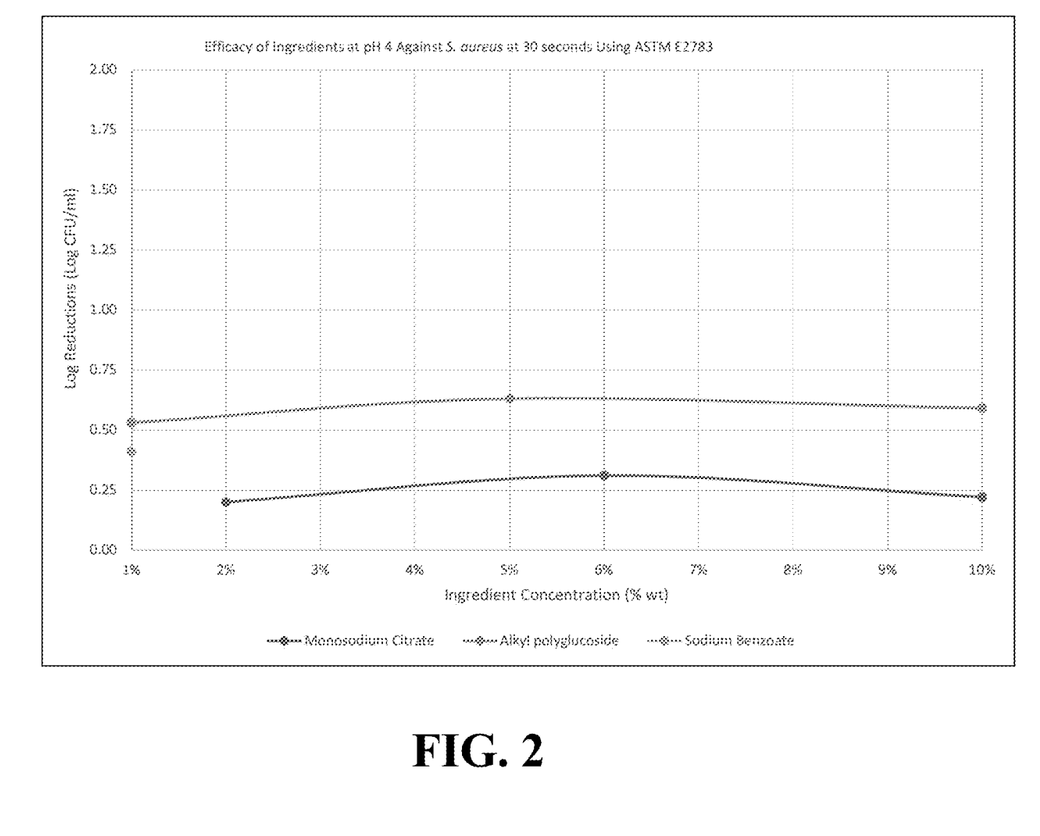
FIG. 2 graphically illustrates the efficacy of individual ingredients against *S. aureus* at a contact time of 30 seconds.

As illustrated above in Table 5 and accompanying FIG. 2, even when the individual concentrations of the non-ionic surfactant (alkyl polyglucoside) and buffer (monosodium citrate) were increased to individual concentrations of 9.0-11.0 wt. %, the compositions did not show antimicrobial efficacy. Thus, this further supports that it is the synergistic combination of the ingredients that provides the unexpected increase in antimicrobial efficacy.

Example 6

The efficacy of the antimicrobial composition was tested against *S. aureus* 6538 at a contact time of 90 seconds, based on the AOAC 961.02 test method, modified for towelettes. Three different groups of compositions were tested: Group A includes a comparative sample including only ethanol and a non-ionic surfactant; Group B comprises an inventive composition that included ethanol, a non-ionic surfactant, a buffer, and an enhancer; and Group C comprises a second inventive composition that included ethanol, a non-ionic surfactant, a buffer, an enhancer, and a chelating agent. For each composition group, the ethanol levels were varied to demonstrate that it is not ethanol alone causing the reduction in *S. aureus*.

TABLE 6

| Formula Number | Ethanol | Non-ionic surfactant | Buffer | Enhancer | Chelating agent | pH | Percent of Carriers Positive |
|---|---|---|---|---|---|---|---|
| A-1 | 40% | 0.65-0.8% | — | — | — | 3.00 | 18% |
| A-2 | 30% | 0.65-0.8% | — | — | — | 3.03 | 62% |
| A-3 | 20% | 0.65-0.8% | — | — | — | 2.99 | 100% |
| A-4 | 10% | 0.65-0.8% | — | — | — | 2.99 | 100% |
| B-1 | 50% | 0.4-0.65% | 0.5-0.8% | 0.3-0.6% | — | 4.00 | 0% |
| B-2 | 45% | 0.4-0.65% | 0.5-0.8% | 0.3-0.6% | — | 4.00 | 5% |
| B-3 | 40% | 0.4-0.65% | 0.5-0.8% | 0.3-0.6% | — | 4.00 | 1% |
| B-4 | 35% | 0.4-0.65% | 0.5-0.8% | 0.3-0.6% | — | 4.00 | 9% |
| B-5 | 30% | 0.4-0.65% | 0.5-0.8% | 0.3-0.6% | — | 4.00 | 3% |
| B-6 | 25% | 0.4-0.65% | 0.5-0.8% | 0.3-0.6% | — | 4.00 | 5% |
| B-7 | 20% | 0.4-0.65% | 0.5-0.8% | 0.3-0.6% | — | 4.00 | 10% |
| B-8 | 15% | 0.4-0.65% | 0.5-0.8% | 0.3-0.6% | — | 4.00 | 15% |
| B-9 | 10% | 0.4-0.65% | 0.5-0.8% | 0.3-0.6% | — | 4.00 | 30% |
| B-10 | 5% | 0.4-0.65% | 0.5-0.8% | 0.3-0.6% | — | 4.00 | 75% |
| C-1 | 50% | 0.65-0.8% | 0.1-0.4% | 1.0-1.5% | 0.5-0.25% | 3.40 | 2% |
| C-2 | 45% | 0.65-0.8% | 0.1-0.4% | 1.0-1.5% | 0.5-0.25% | 3.40 | 0% |
| C-3 | 40% | 0.65-0.8% | 0.1-0.4% | 1.0-1.5% | 0.5-0.25% | 3.40 | 6% |

TABLE 6-continued

| Formula Number | Ethanol | Non-ionic surfactant | Buffer | Enhancer | Chelating agent | pH | Percent of Carriers Positive |
|---|---|---|---|---|---|---|---|
| C-4 | 35% | 0.65-0.8% | 0.1-0.4% | 1.0-1.5% | 0.5-0.25% | 3.40 | 8% |
| C-5 | 30% | 0.65-0.8% | 0.1-0.4% | 1.0-1.5% | 0.5-0.25% | 3.40 | 16% |
| C-6 | 25% | 0.65-0.8% | 0.1-0.4% | 1.0-1.5% | 0.5-0.25% | 3.40 | 3% |
| C-7 | 20% | 0.65-0.8% | 0.1-0.4% | 1.0-1.5% | 0.5-0.25% | 3.40 | 13% |
| C-8 | 15% | 0.65-0.8% | 0.1-0.4% | 1.0-1.5% | 0.5-0.25% | 3.40 | 8% |
| C-9 | 10% | 0.65-0.8% | 0.1-0.4% | 1.0-1.5% | 0.5-0.25% | 3.40 | 19% |
| C-10 | 5% | 0.65-0.8% | 0.1-0.4% | 1.0-1.5% | 0.5-0.25% | 3.40 | 55% |

Figure 3:
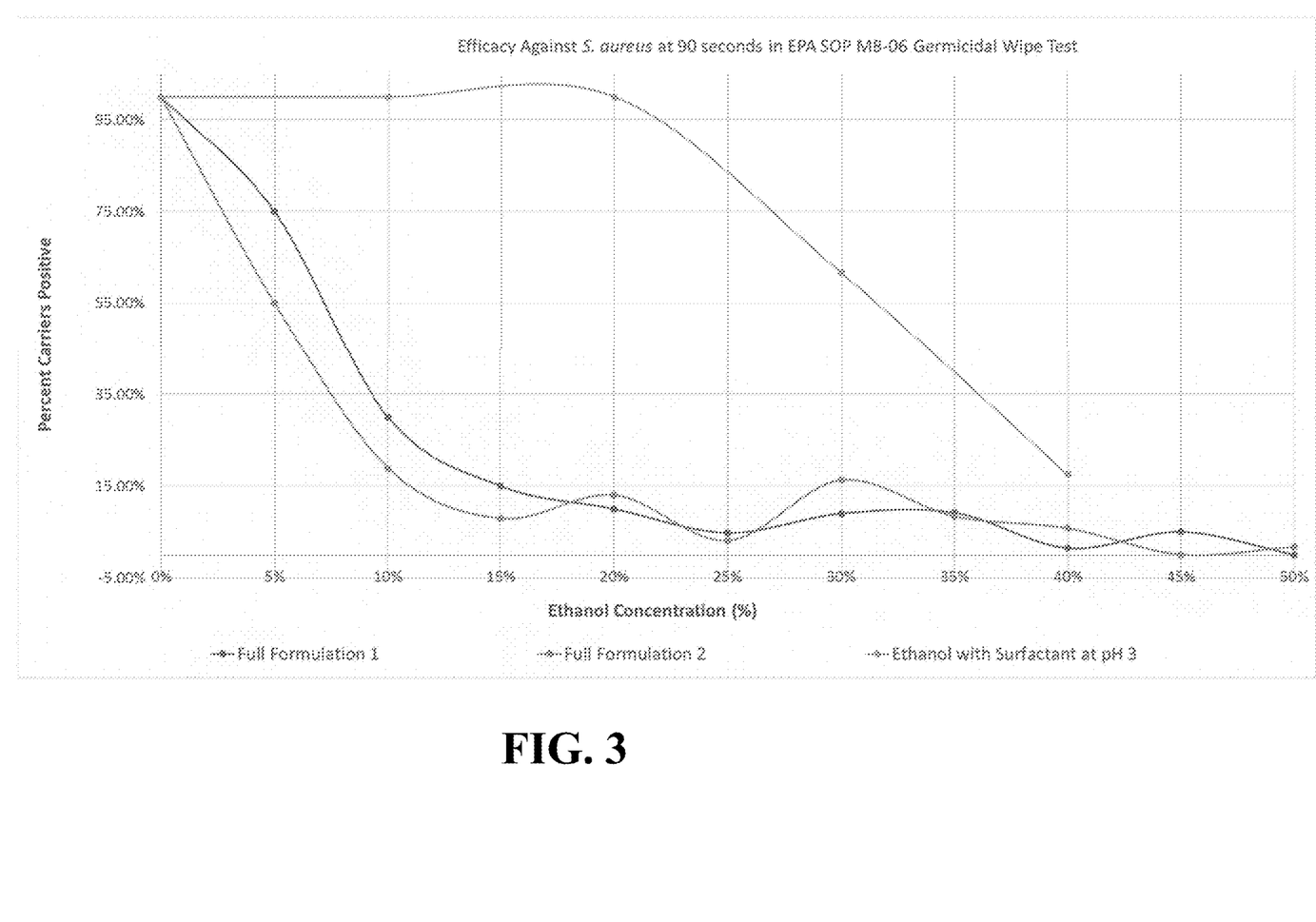
FIGS. 3 and 4 graphically illustrate the efficacy of various compositions against *S. aureus* at a contact time of 90 seconds.
Figure 4:
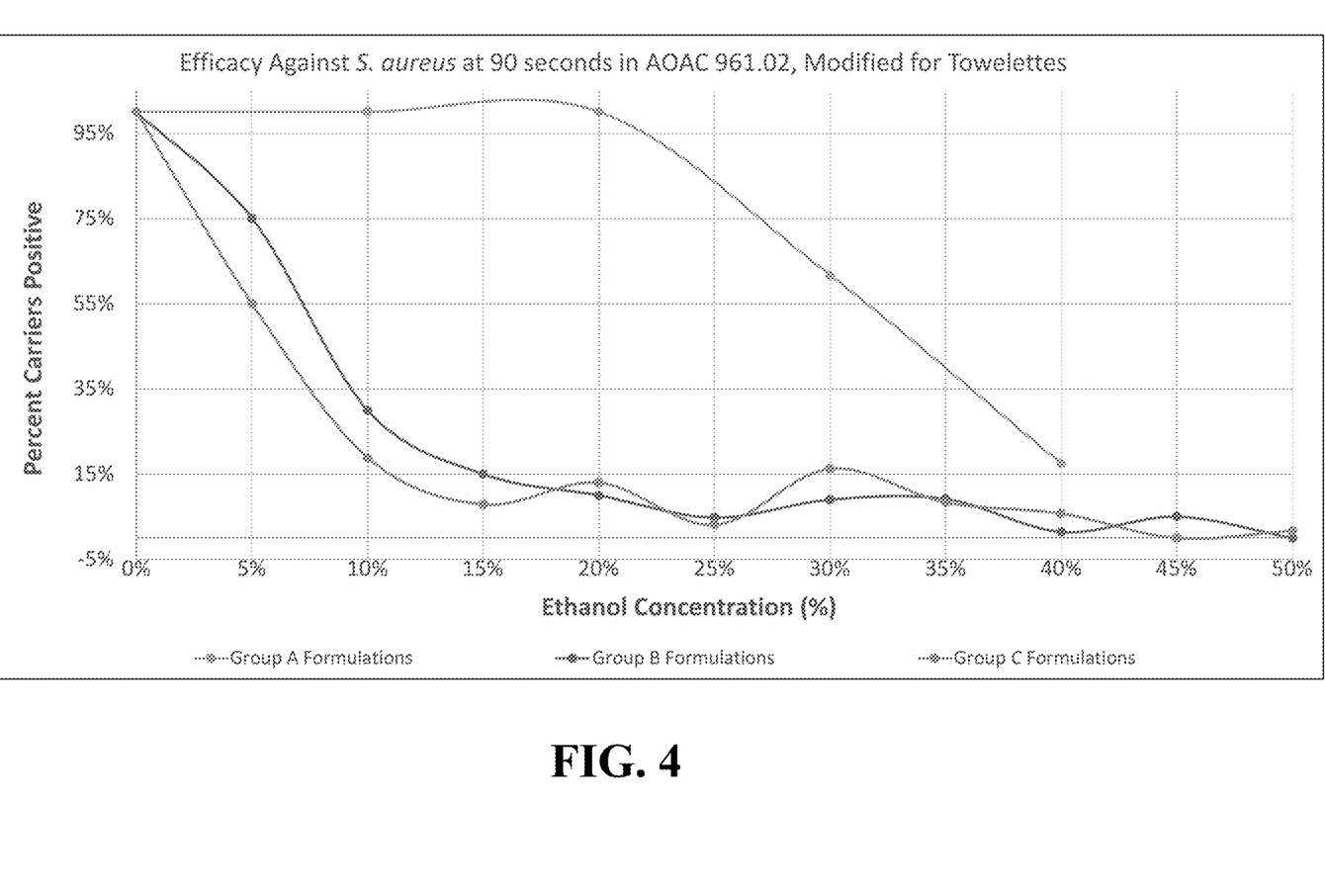

As shown above in Table 6 and illustrated in FIG. 3, Comparative Example Group A (ethanol+surfactant) did not achieve an efficacy of less than 15% of carriers positive, even at ethanol levels upwards of 40%. At ethanol levels of 10-20%, there was growth of *S. aureus* from all carriers. In contrast, Group B formulations (comprising ethanol+surfactant+a buffer+an enhancer) demonstrated efficacy starting at 10% ethanol and achieved 10% or lower carriers with growth at ethanol levels at 20% or above. Group C formulations (comprising ethanol+surfactant+a buffer+an enhancer) also demonstrated high efficacy at the low ethanol levels, with the percent positive carriers being less than 15% starting at 15% ethanol concentration. Thus, the efficacy of the formulation is improved by the addition of at least two of a surfactant, enhancer, and buffer.

Example 7

The efficacy of the antimicrobial composition comprising alcohol and two or more of a non-ionic surfactant, enhancer, and a buffer was tested to determine their effectiveness on hard, non-porous, inanimate environmental surfaces according to modified AOAC 961.02 method. Formulations were sprayed onto glass slides inoculated with *S. aureus* and neutralized after 20 seconds of exposure to the formulation. The reduction in *S. aureus* was then quantified and recorded.

As shown below in Table 7, Sample (a) includes each of ethanol, a non-ionic surfactant, a buffer, and an enhancer, at a low pH of 3.40, and achieves a very efficacious log reduction of 5.31 log CFU. Samples (b)-(d) demonstrate that one of the surfactant, buffer, or enhancer can be removed while still maintaining efficacy.

TABLE 7

| Composition | Ethanol | Non-ionic surfactant | Buffer | Enhancer | pH | Log Reductions (Log CFU) |
|---|---|---|---|---|---|---|
| (a) | 22.0-27.0% | 0.65-0.8% | 1.0-1.5% | 0.1-0.4% | 3.40 | 5.31 |
| (b) | 22.0-27.0% | 0.65-0.8% | 1.0-1.5% | 0.00% | 3.40 | 5.62 |
| (c) | 22.0-27.0% | 0.65-0.8% | 0.00% | 0.1-0.4% | 3.40 | 4.18 |
| (d) | 22.0-27.0% | 0.00% | 1.0-1.5% | 0.1-0.4% | 3.40 | 4.02 |
| (e) | 0.00% | 0.65-0.8% | 1.0-1.5% | 0.1-0.4% | 3.40 | 3.41 |

Example 8

The efficacy of the antimicrobial composition comprising alcohol and two or more of a non-ionic surfactant, enhancer, and a buffer was tested to determine their effectiveness on hard, non-porous, inanimate environmental surfaces according to modified AOAC 961.02 method. Formulations were sprayed onto glass slides inoculated with *S. aureus* and neutralized after 20 seconds of exposure to the formulation. The reduction in *S. aureus* was then quantified and recorded.

Table 8, below, demonstrates that there is no loss in efficacy when ingredients in the same category are substituted within the formulation. For instance, in Composition b, salicylic acid was substituted for sodium benzoate (Composition a) as an enhancer. Each composition maintained sufficient efficacy with log reductions of at least 4 log CFU. The same maintenance in efficacy is found in Compositions c and b, wherein sodium lauryl sulfate was substituted for caprylyl/capryl glucoside. Compositions e-f include various surfactants that all demonstrate sufficient efficacy when included in the inventive composition.

TABLE 8

| Comp. | Ethanol | Caprylyl/ Capryl Glucoside | Sodium lauryl sulfate | Undeceth-5 | Trideceth 9 | Caprylyl Glucoside | Laureth 7 | Mono Sodium Citrate | Glutaric Acid | Sodium Benzoate | Salicylic Acid | pH | Log Reductions (Log CFU) |
|---|---|---|---|---|---|---|---|---|---|---|---|---|---|
| a | 20.00 | 0.71 | — | — | — | — | — | 1.28 | — | 0.33 | — | 3.40 | 4.75 |
| b | 20.00 | 0.71 | — | — | — | — | — | 1.28 | — | — | 0.33 | 3.40 | 5.17 |

TABLE 8-continued

| Comp. | Ethanol | Caprylyl/ Capryl Glucoside | Sodium lauryl sulfate | Undeceth-5 | Trideceth 9 | Caprylyl Glucoside | Laureth 7 | Mono Sodium Citrate | Glutaric Acid | Sodium Benzoate | Salicylic Acid | pH | Log Reductions (Log CFU) |
|---|---|---|---|---|---|---|---|---|---|---|---|---|---|
| c | 20.00 | 0.71 | — | — | — | — | — | — | 1.28 | 0.33 | — | 3.40 | 4.96 |
| d | 20.00 | — | 0.71 | — | — | — | — | — | 1.28 | 0.33 | — | 3.40 | 5.57 |
| e | 20.00 | — | — | — | — | 0.71 | — | — | 1.28 | 0.33 | — | 3.40 | 4.15 |
| f | 20.00 | — | — | 0.71 | — | — | — | — | 1.28 | 0.33 | — | 3.40 | 5.29 |
| g | 20.00 | — | — | — | 0.71 | — | — | — | 1.28 | 0.33 | — | 3.40 | 5.45 |
| h | 20.00 | — | — | — | — | — | 0.71 | — | 1.28 | 0.33 | — | 3.40 | 5.61 |

Although exemplary embodiments have been described herein, it should be appreciated that many modifications can be made without departing from the spirit and scope of the general inventive concepts. All such modifications are intended to be included within the scope of the exemplary embodiments disclosed herein, which is to be limited only by the following claims.

What is claimed is:

1. An antimicrobial composition comprising:
   from greater than 15 to less than 25 wt. % collectively of a $C_{1-8}$ alcohol;
   from 0.5 to 2 wt. % of a surfactant comprising an alkyl polyglucoside;
   an enhancer comprising sodium benzoate; and
   a buffer comprising citric acid or a salt thereof,
   wherein the total concentration of the buffer and the enhancer collectively is from 1 to 3 wt. %, based on the total weight of the antimicrobial composition,
   wherein the pH of the antimicrobial composition is less than 5,
   wherein the antimicrobial composition is devoid of peroxide,
   wherein the antimicrobial composition achieves a microbial log reduction of greater than 4.0 log CFU/ml at a contact time of 1 minute, in accordance with ASTM E2783, and
   wherein each wt. % is based on the total weight of the antimicrobial composition.

2. The antimicrobial composition of claim 1, wherein the composition comprises from 18 to 22 wt. % collectively of the $C_{1-8}$ alcohol, based on the total weight of the antimicrobial composition.

3. The antimicrobial composition of claim 1, wherein the antimicrobial composition has a pH of from 1.5 to 4.5.

4. The antimicrobial composition of claim 1, wherein the antimicrobial composition comprises from 0.5 to 2 wt. % of the buffer, based on the total weight of the antimicrobial composition.

5. The antimicrobial composition of claim 1, wherein the antimicrobial composition comprises from 0.1 to 0.4 wt. % of the enhancer, based on the total weight of the antimicrobial composition.

6. A wipe comprising the antimicrobial composition of claim 1.

7. An antimicrobial composition comprising:
   from greater than 15 to less than 25 wt. % collectively of a $C_{1-8}$ alcohol;
   from 0.5 to 2 wt. % of a surfactant comprising an alkyl polyglucoside;
   an enhancer comprising a salt of an aromatic acid; and
   from 0.5 to 2 wt. % of a buffer, the buffer comprising an organic acid, an inorganic acid, salts thereof, or combinations thereof,
   wherein the total concentration of the buffer and the enhancer collectively is from 1 to 3 wt. %,
   wherein the pH of the antimicrobial composition is less than 5,
   wherein the antimicrobial composition is devoid of peroxide,
   wherein the antimicrobial composition achieves a microbial log reduction of greater than 4.0 log CFU/ml at a contact time of 1 minute, in accordance with ASTM E2783, and
   wherein each wt. % is based on the total weight of the antimicrobial composition.

8. The antimicrobial composition of claim 7, wherein the composition comprises from 18 to 22 wt. % collectively of the $C_{1-8}$ alcohol, based on the total weight of the antimicrobial composition.

9. The antimicrobial composition of claim 7, wherein the antimicrobial composition has a pH of from 1.5 to 4.5.

10. The antimicrobial composition of claim 7, wherein the antimicrobial composition comprises from 0.1 to 0.4 wt. % of the enhancer, based on the total weight of the antimicrobial composition.

11. A wipe comprising the antimicrobial composition of claim 7.

12. An antimicrobial composition consisting of:
   from greater than 15 to less than 25 wt. % collectively of a $C_{1-8}$ alcohol, based on the total weight of the antimicrobial composition;
   a non-ionic surfactant consisting of alkyl polyglucoside;
   an enhancer consisting of a salt of an aromatic acid;
   a buffer selected from the group consisting of an organic acid, an inorganic acid, salts thereof, or combinations thereof; and
   water,
   wherein the pH of the antimicrobial composition is less than 5, and
   wherein the antimicrobial composition achieves a microbial log reduction of greater than 4.0 log CFU/ml at a contact time of 1 minute, in accordance with ASTM E2783.

13. The antimicrobial composition of claim 12, wherein the total concentration of the buffer and the enhancer collectively is from 1 to 3 wt. %, based on the total weight of the antimicrobial composition.

14. The antimicrobial composition of claim 12, wherein the buffer is present in an amount from 0.5 to 2 wt. %, based on the total weight of the antimicrobial composition.

15. The antimicrobial composition of claim 12, wherein the enhancer is present in an amount from 0.1 to 0.4 wt. %, based on the total weight of the antimicrobial composition.

16. A wipe comprising the antimicrobial composition of claim 12.

* * * * *